United States Patent
Utsunomiya

(10) Patent No.: US 8,947,749 B2
(45) Date of Patent: Feb. 3, 2015

(54) IMAGE READING APPARATUS, CONTROL METHOD OF IMAGE READING APPARATUS, AND STORAGE MEDIUM

(75) Inventor: Takehito Utsunomiya, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 441 days.

(21) Appl. No.: 12/949,595

(22) Filed: Nov. 18, 2010

(65) Prior Publication Data

US 2011/0149357 A1 Jun. 23, 2011

(30) Foreign Application Priority Data

Dec. 18, 2009 (JP) ................................. 2009-287348

(51) Int. Cl.
- *H04N 1/04* (2006.01)
- *H04N 1/409* (2006.01)
- *G06K 15/00* (2006.01)
- *H04N 1/407* (2006.01)

(52) U.S. Cl.
CPC .................................. *H04N 1/4097* (2013.01)
USPC ............................ 358/475; 358/2.1; 358/3.26

(58) Field of Classification Search
CPC . G01N 21/94; H04N 1/00909; H04N 5/2171; H04N 1/4097; H04N 5/367
See application file for complete search history.

(56) References Cited

U.S. PATENT DOCUMENTS

| | | | | |
|---|---|---|---|---|
| 2005/0280867 | A1* | 12/2005 | Arai | 358/2.1 |
| 2009/0316002 | A1* | 12/2009 | Ishiga | 348/187 |
| 2010/0002103 | A1* | 1/2010 | Shintani | 348/251 |

FOREIGN PATENT DOCUMENTS

| | | | | |
|---|---|---|---|---|
| JP | 2001-86333 | A | | 3/2001 |
| JP | 2001086333 | A | * | 3/2001 |
| JP | 2002-176542 | A | | 6/2002 |
| JP | 2002176542 | A | * | 6/2002 |
| JP | 2005-269545 | A | | 9/2005 |

* cited by examiner

*Primary Examiner* — Thierry L Pham
(74) *Attorney, Agent, or Firm* — Canon USA, Inc. IP Division

(57) ABSTRACT

A method includes reading an image of a document obtained by a reading unit exposing the document to light with an exposure unit, causing the reading unit to perform first reading processing for reading first information obtained by causing the exposure unit to perform exposure with a first light amount, and second reading processing for reading second information obtained by causing the exposure unit to perform exposure with a second light amount that is smaller than the first light amount while no document is placed at a reading position of the reading unit, and detecting a foreign matter existing at the reading position according to a difference between the first and second information.

14 Claims, 6 Drawing Sheets

FIG. 5A
FIG. 5B
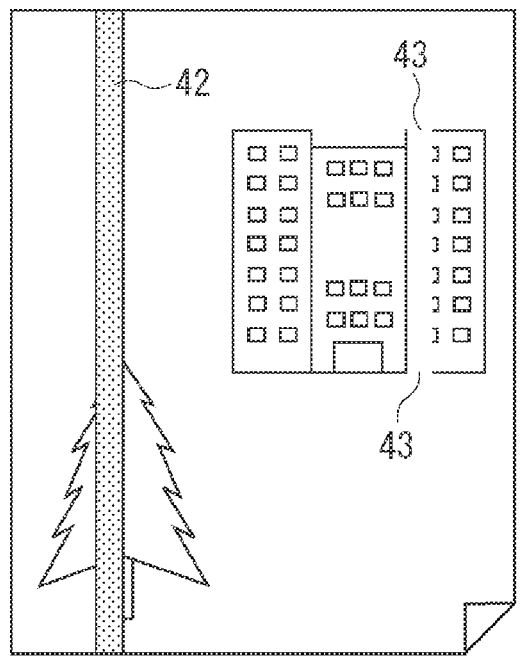
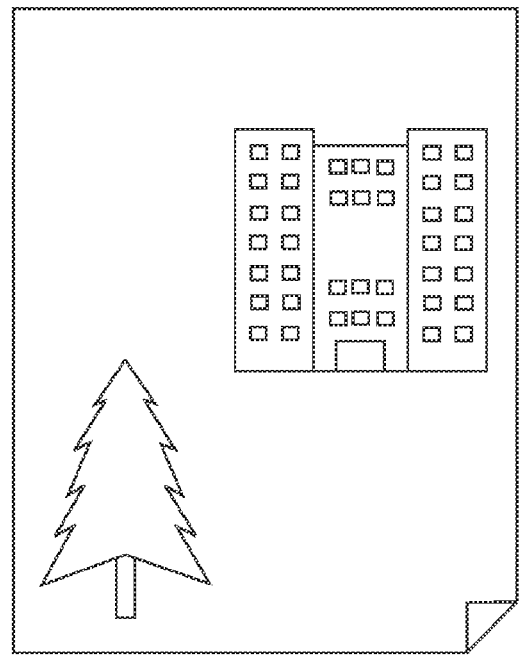

IMAGE READING APPARATUS, CONTROL METHOD OF IMAGE READING APPARATUS, AND STORAGE MEDIUM

BACKGROUND OF THE INVENTION

1. Field of the Invention

The present invention relates to an image reading apparatus, a control method of the image reading apparatus, and a storage medium thereof.

2. Description of the Related Art

The conventional image reading apparatus, which reads an image while a document is moved, includes a function to correct an adverse effect caused by an foreign matter (i.e., dust or the like) attached to a document positioning glass. In such image reading apparatus, a document guide plate is read out before the document is read out, and a position and a size of the dust on a platen is calculated to make correction thereof based on information of thus read out document guide plate (see, Japanese Patent Application Laid-open No. 2002-176542). In order to detect white dust which has the same color as the white document guide plate, some image reading apparatus include a detection circuit dedicated to the white dust in addition to a detection circuit for black dust (see, Japanese Patent Application Laid-open No. 2001-86333).

However, in detecting dust having the same color (e.g., a white color) as the document guide plate, the dedicated circuit as disclosed in Japanese Patent Application Laid-open No. 2001-86333 is additionally required. As a result thereof, the apparatus in its entirety requires increased cost.

SUMMARY OF THE INVENTION

According to an aspect of the present invention, an apparatus includes a reading unit configured to read an image of a document obtained such that the document is exposed to light by an exposure unit, a control unit configured to cause the reading unit to perform a first reading processing for reading first information by exposing the exposure unit to light with a first light amount and to perform a second reading processing for reading second information by exposing the exposure unit to light with a second light amount that is smaller than the first light amount while no document is placed at a reading position according to the reading unit, and a detecting unit configured to detect a foreign matter existing at the reading position according to a difference between the first and second information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B, respectively, illustrates a reading state of an image by the image reading apparatus.

DESCRIPTION OF THE EMBODIMENTS

Various exemplary embodiments, features, and aspects of the invention will be described in detail below with reference to the drawings.

Figure 1:
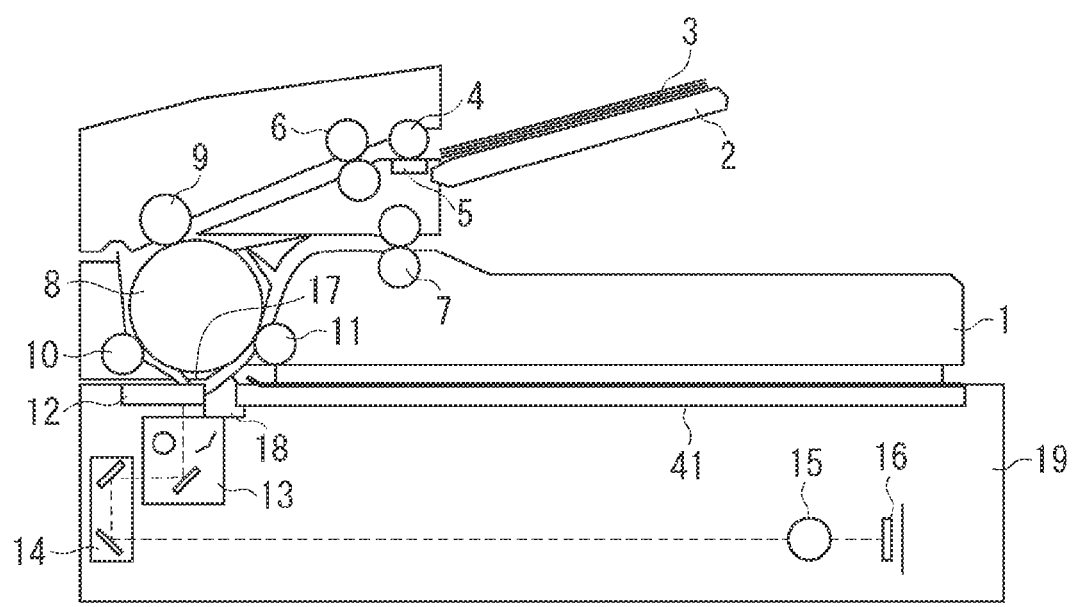
FIG. 1 is a cross sectional view illustrating a configuration of an image reading apparatus.

FIG. 1 is a cross sectional view illustrating a configuration of an image reading apparatus according to an exemplary embodiment of the present invention. The image reading apparatus according to the present exemplary embodiment includes an automatic document feeder (ADF) 1 and a document reading apparatus 19. The image reading apparatus according to the present exemplary embodiment includes a reading-feeding mode for reading out information on a document while the document is conveyed from the ADF 1 under a condition that an exposure unit 13 is stopped at a predetermined position within the document reading apparatus 19.

Further, the image reading apparatus according to the present exemplary embodiment includes a normal reading mode for reading out a document that is placed by a user at a predetermined position on a document positioning glass 41 while the exposure unit 13 is moved over the document in a sub-scanning direction (i.e., in a direction the exposure unit (i.e., a document scanning unit) 13 moves) at a speed according to a magnification. An operation for reading out the document according to the reading-feeding mode is described below.

A main scanning direction is a direction almost orthogonal to the conveyance direction of the document. In other words, the main scanning direction is a direction in which a reflected image that is formed on a charge-coupled device (CCD) sensor unit 16 is scanned. In the following description, dust is exemplified as a foreign matter. However, the foreign matter may include a stain rubbed on the document positioning glass 41.

A document 3 is set to a document tray 2 by the user. A sheet feeding roller 4 is paired with a separating pad 5 in order to separate the documents one by one to supply a single sheet of document 3 toward a larger roller 8. Thus supplied document 3 is further conveyed by an intermediate roller pair 6 into the apparatus. Subsequently, the document 3 is taken into a conveyance mechanism performed by the larger roller 8 and a first driven roller 9. Then, document 3 is conveyed by a second driven roller 10 while the document 3 is moving around the larger roller 8.

The document 3 conveyed by the larger roller 8 and the second driven roller 10 passes between a document positioning glass 12 and a document guide plate 17, which are used in the reading-feeding mode, to be further conveyed through a jump 18 by the larger roller 8 and a third driven roller 11. A document guide plate 17 is made of a white or whitish member.

In the present exemplary embodiment, the document guide plate 17 is exposed to light twice with varied light amount levels by the exposure unit 13, and the reflected image thereof is read out by the CCD sensor unit 16, which functions as a reading unit. Then, the foreign matters having different attributes and positions of the foreign matters can be detected by performing arithmetic processing by a central processing unit (CPU) 21 of a controller unit 20, which is described with reference to FIG. 2.

The attribute indicates a color of the foreign matter attached to the document guide plate 17. In the present exemplary embodiment, the below described CPU 21 can specify a color attribute of the foreign matter attached to the document guide plate 17 whether it is black or white.

The document 3 is conveyed by a member of the document guide plate 17 between the document positioning glass 12 and the document guide plate 17 in such a manner that the document 3 contacts the document positioning glass 12. The document 3 that is conveyed by the larger roller 8 and the third driven roller 11 is discharged to the outside of the apparatus by a document discharge roller pair 7.

The document 3 is exposed to light by the exposure unit 13 in such a manner that a surface of the document 3 facing to the document positioning glass 12 is permeated by the light while the document 3 passes over the document positioning glass 12. The exposure unit 13 exposes the surface of the document 3 to light, thereby transmitting document image information (i.e., optical information) reflected from the document 3 to a mirror unit 14.

The exposure unit 13 is provided to be arranged linearly from a front side toward a back side in FIG. 1, and transmits a line-shaped document image information to the mirror unit 14. Thus transmitted document image information passes through a lens 15 to be collected and converted into an electric signal by the CCD sensor unit 16.

The CCD sensor unit 16 may be made of a contact image sensor (CIS).

Figure 2:
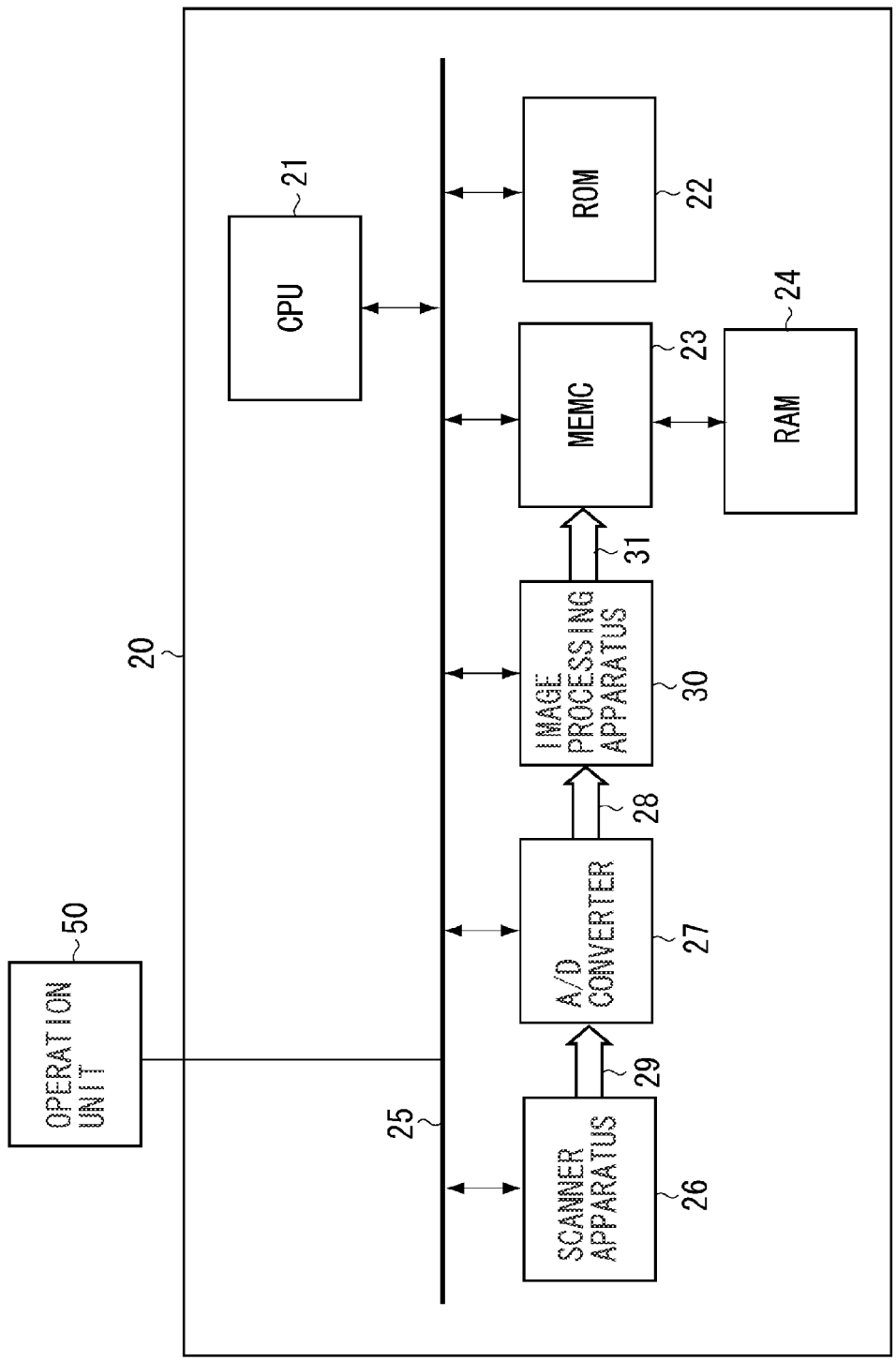
FIG. 2 is a block diagram illustrating a controlling structure of the image reading apparatus.

FIG. 2 is a block diagram illustrating a controlling structure of the image reading apparatus illustrated in FIG. 1. In FIG. 2, a scanner apparatus 26 illustrated in FIG. 1 outputs an analog video signal to an analog/digital (A/D) converter 27 of the controller unit 20 through a data bus 29.

The A/D converter 27 converts the analog video signal output from the above described scanner apparatus 26 into digital video data, and outputs thus converted digital video data in the form of a digital signal through a bus 28. An image processing unit 30 receives the digital data output from the A/D converter 27, and outputs the digital data through a bus 31 after the digital data is subjected to various types of image processing.

A central processing unit (CPU) 21 controls the image reading apparatus in its entirety. The CPU 21 controls the image reading apparatus according to a program preliminary stored in a non-volatile storage device (ROM) 22. Further, the CPU 21 detects white dust attached to the document guide plate 17 according to steps illustrated in the below described flow chart.

A memory controller (MEMC) 23 is connected to a bus 31 output from a system bus 25 and an image processing unit 30 within the image reading apparatus so as to control an access to a RAM 24 including volatile storage devices.

A memory controller 23 causes the RAM 24 to store digital data output from the A/D converter 27. Further, the memory controller 23 reads and writes data through the system bus 25 from the CPU 21.

With reference to FIG. 3, processing for detecting an attribute and a position of the foreign matters attached to the document positioning glass 41 is described below.

FIG. 3 illustrates processing for detecting the attribute and the position of the foreign matters attached to the document positioning glass 41 illustrated in FIG. 1. In FIG. 3A, a position 12 (hereinafter sometimes referred to as document positioning glass 12) of the document positioning glass 41 corresponds to a reading position read by the scanner apparatus 26.

Figure 3A:
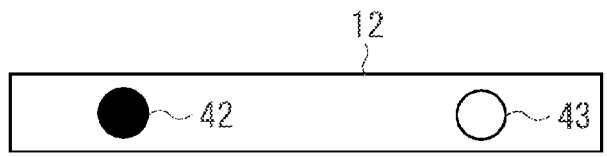
FIGS. 3A through 3D, respectively, illustrates a detection principle of a foreign matter that is attached to a document positioning glass.

As illustrated in FIG. 3A, it is so assumed that dust 42, e.g., a speck and dirt and dust 43, e.g., a stain of whiteout and paper dust, are attached onto the document positioning glass 41 as the foreign matters.

Under the above described condition, the CPU 21 performs a first reading processing that a reflected image (i.e., optical information) obtained by exposing to light and scanning the document guide plate 17 at a level of "high" is converted into digital data by the A/D converter 27 (i.e., the first reading processing). Then, the CPU 21 generates a density histogram H1 illustrated in FIG. 3B to store the density histogram H1 in the RAM 24. Hereinafter, the density histogram is merely referred to as the histogram for a simple description thereof.

In the histogram H1, a density level 51 represents a density level of the dust 42 attached to the document positioning glass 41. Density levels 52 and 53 represent density levels obtained based on a shadow of an edge of the dust 43 attached to the document positioning glass 41.

Figure 3B:
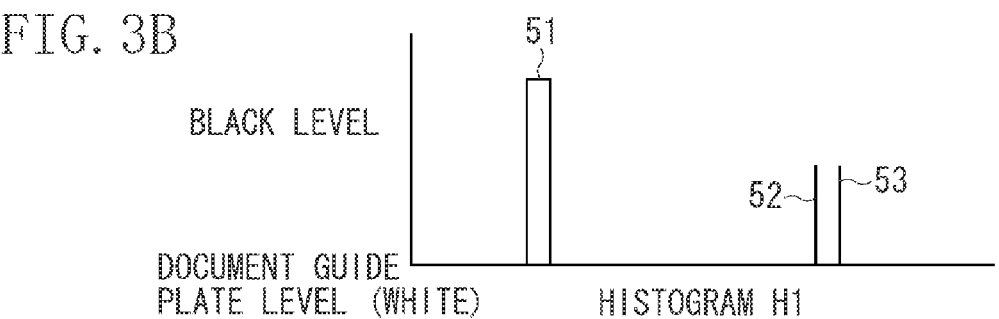

The dust 43 attached to the document positioning glass 41 illustrated in FIG. 3A has the same color (i.e., a white color) as the document guide plate 17 illustrated FIG. 1, so that there is no difference of density level found between the density levels 52 and 53. However, the edge is different in a way of light reflection from the white portion between the density levels 52 and 53, so that different density levels are detected as illustrated in FIG. 3B.

Then, in a second reading processing, the CPU 21 causes the scanner apparatus 26 to read the document 3 with a light amount less than the light amount of the first reading processing. The scanner apparatus 26 converts the reflected information (i.e., the optical information) obtained by exposing the document guide plate 17 to light and scanning the document guide plate 17, into digital data by the A/D converter 27 through a bus 29.

Figure 3C:
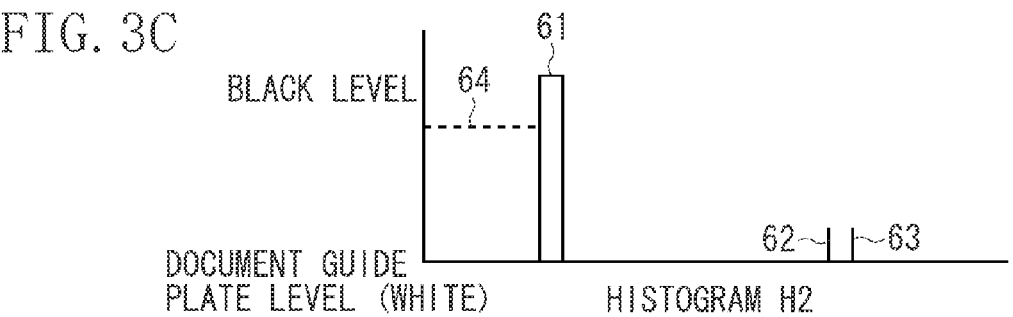

In the present exemplary embodiment, the CPU 21 generates a histogram H2 illustrated in FIG. 3C based on the digital data output from the A/D converter 27, and causes the volatile storage device (RAM) 24 to store the histogram H2.

In the histogram H2 illustrated in FIG. 3C, a density level 61 represents a density level of the dust 42 attached to the document positioning glass 41. Density levels 62 and 63 are obtained based on a shadow of an edge of the dust attached to the document positioning glass 41. In the density levels 62 and 63, since an exposure level (i.e., level of "low") is lower than that of S1 (i.e., the level of "high"), the obtained density level becomes lower than that of the histogram H1 illustrated in FIG. 3B.

Specifically, as illustrated in FIGS. 3A through 3D, the density level obtained based on the shadow of the edge of the white dust decreases more largely than the density level obtained based on the shadow of the edge of the black dust when the light amount drops.

In the present exemplary embodiment, the CPU 21 subtracts the histogram H2 illustrated in FIG. 3C from the histogram H1 illustrated in FIG. 3B to generate the histogram H3. Then, the CPU 21 causes the RAM 24 to store the histogram H3.

A difference of between levels of the histograms illustrated in FIG. 3B and FIG. 3C is generated based on a difference of a light amount emitted from the exposure unit 13. In the present exemplary embodiment, the CPU 21 causes a light emission amount of the exposure unit 13 to be varied to read the document guide plate 17 twice. Then, the CPU 21 calculates a difference between the histogram H1 and the histogram H2, and extracts a portion having more than a predetermined value between the peak values of the histogram H3 as the difference.

The CPU 21 specifies both end positions of the white dust. Then, the CPU 21 compares a distance between the both end positions of the white dust with a distance value preliminary stored in a ROM 22 to determine whether the dust is white dust, black dust or dust other than the white dust and the black dust.

Figure 4A:
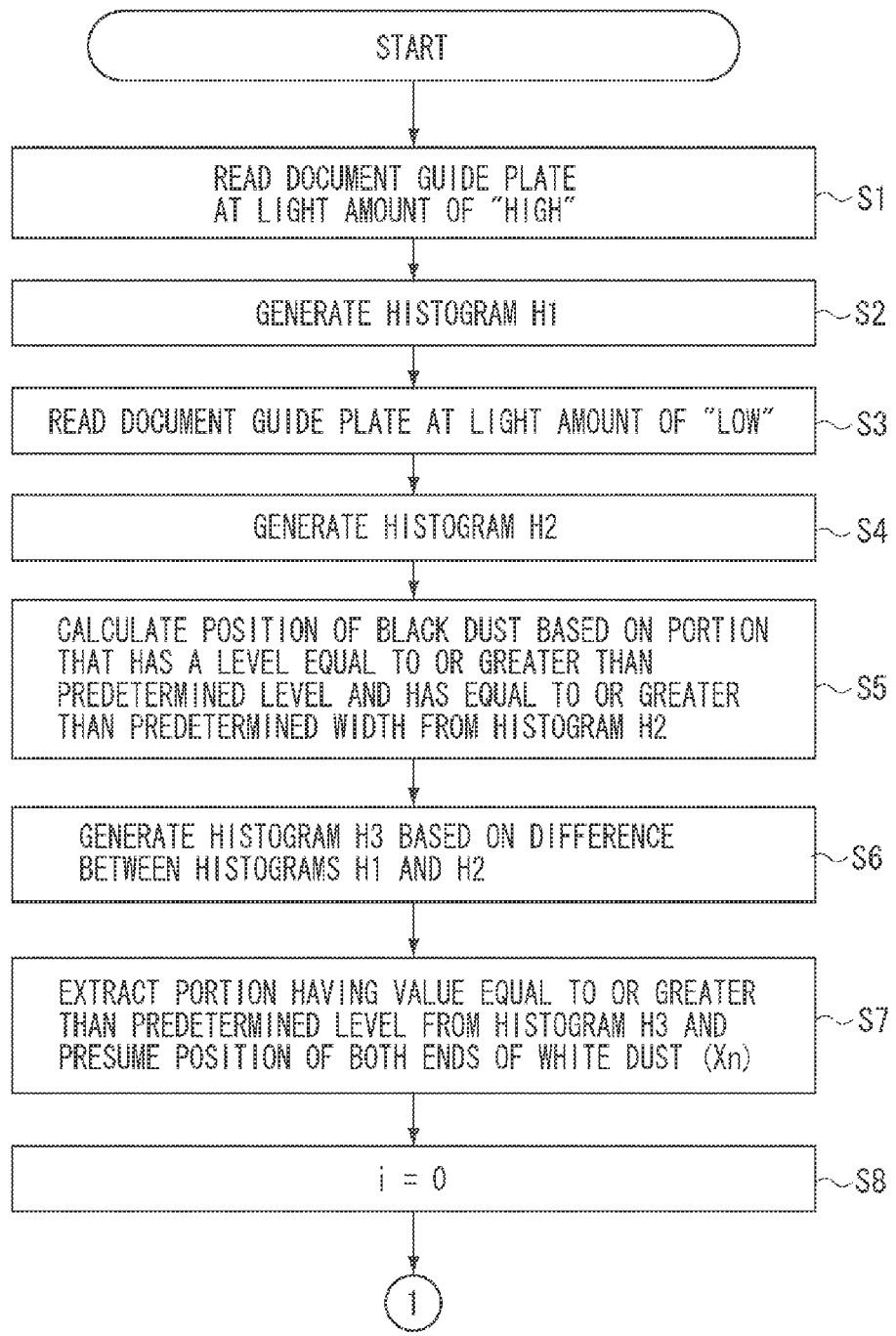
FIG. 4 (FIGS. 4A and 4B) is a flow chart illustrating controlling steps of the image reading apparatus.
Figure 4B:
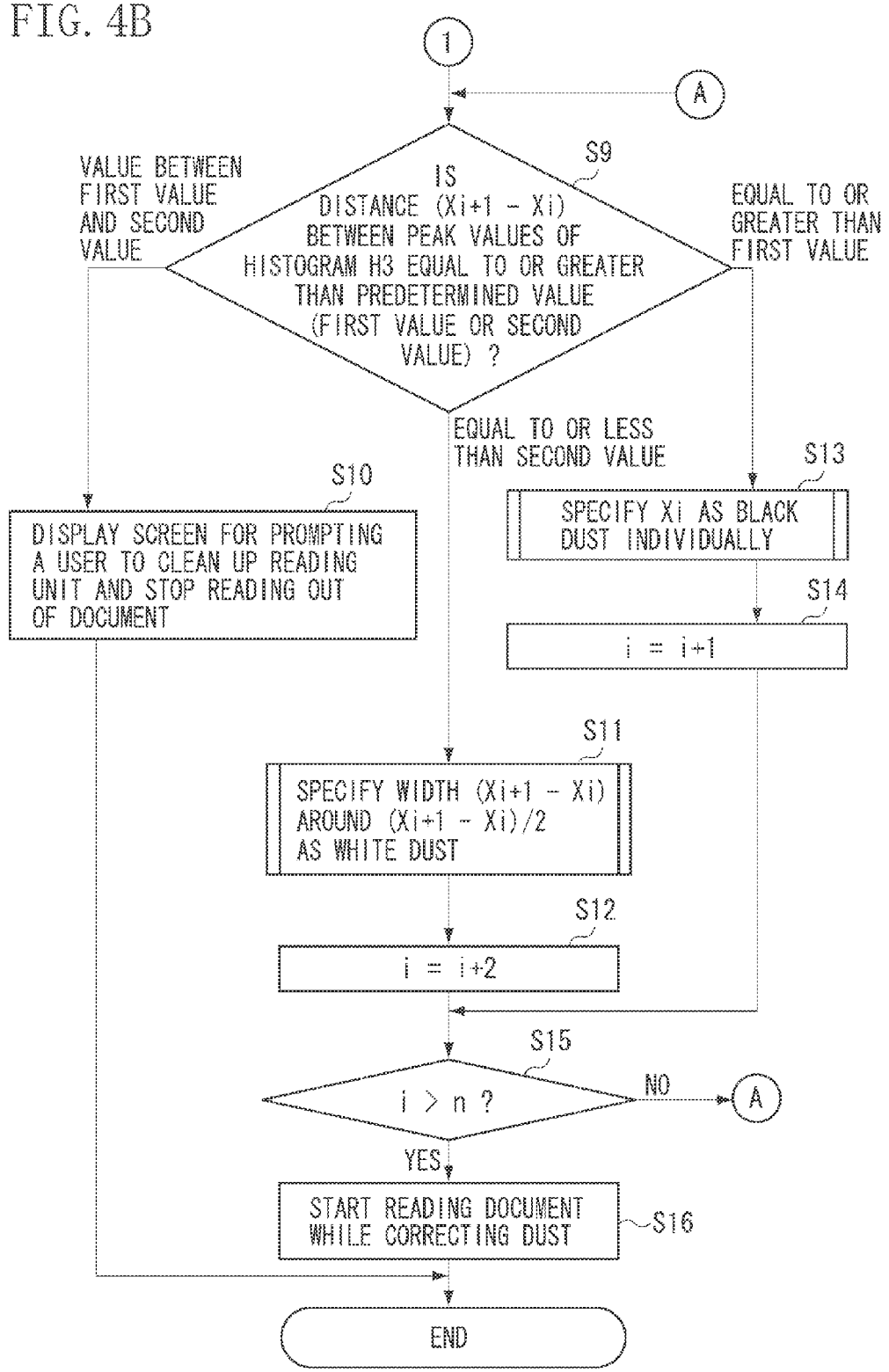

The CPU 21 further performs correction processing with respect to each of images to be read according to a type of detected dust, or stops the reading processing itself to urge the user to clean up the platen, i.e., to perform a reading control (see, FIGS. 4A and 4B (hereinafter collectively referred to as FIG. 4)).

FIG. 4 is a flowchart illustrating controlling steps of the image reading apparatus according to the present exemplary embodiment. Reading control steps S1 through S16 illustrated in FIG. 4 is realized in such a manner that the CPU 21 loads a program stored in the ROM 22 onto the RAM 24 to execute the program on the RAM 24.

Correction processing is described below in detail. That is, the correction processing is performed in such a manner that the light amount level of the exposure unit 13 is set to a first light amount level or a second light amount level, the document guide plate 17 is exposed to light twice, and a reflected image at the time is read out by the CCD sensor unit 16 as a reading unit.

In the present exemplary embodiment, a reading-feeding mode is exemplified in which the reflected image, which is exposed to light when the document 3 to be conveyed is positioned below the document positioning glass 12, is formed on the CCD sensor unit 16.

In the present exemplary embodiment, the CPU 21 performs the below described steps S1 through S7, so that the histograms H1 and H2 are generated for each light amount level, illustrated in FIG. 3. The CPU 21 further calculates the histogram H3 based on a difference value between thus generated histograms H1 and H2, and performs processing for detecting attributes of the foreign matters having different attributes and positions for each attribute in a manner as described below.

In step S1, the CPU 21 causes the exposure unit 13 to expose the document guide plate 17 to light at a level of "high", converts thus obtained analogue data into digital data by the A/D converter 27, and stores the digital data in RAM 24 through the memory controller 23.

In the present flow chart, as illustrated in FIG. 3A, it is so assumed that dust 42 such as a speck and dirt (corresponding to black dust) and the dust 43 such as a stain of whiteout and paper dust (corresponding to the white dust) are attached onto the document positioning glass 41.

In step S2, the CPU 21 generates the histogram H1 illustrated in FIG. 3B based on the digital data obtained in step S1, and stores the histogram H1 in the RAM 24.

In step S3, the CPU 21 causes the exposure unit 13 to expose the document guide plate 17 to light at a level of "low", converts thus obtained analogue data into digital data by the A/D converter 27, and stores the digital data in the RAM 24 through the memory controller 23. In step S4, the CPU 21 generates the histogram H2 illustrated in FIG. 3C based on the digital data obtained in step S3, and stores the histogram H2 in the RAM 24.

In step S5, the CPU 21 determines that a portion having a value beyond a predetermined density level 64 (i.e., a density level 61 in the present exemplary embodiment) is the black dust based on the histogram H2 generated in step S4.

Figure 3D:
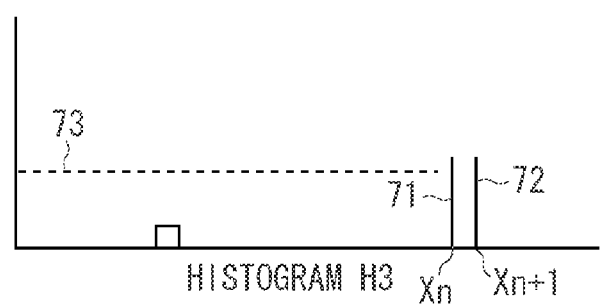

In step S6, the CPU 21 subtracts the histogram H2 obtained in step S4 from the histogram H1 obtained in step S2, thereby generating the histogram H3 illustrated in FIG. 3D.

In step S7, the CPU 21 extracts a portion indicating a value beyond a predetermined value 73 (i.e., a threshold) (i.e., values 71 and 72 in the present exemplary embodiment) based on the histogram H3 generated in step S6. The CPU 21 causes the RAM 24 to store a portion (xn, xn+1) corresponding to a reference position which specifies the extracted value, a first reference position and a second reference position.

In step S8, the CPU 21 secures a region for keeping a count value within the RAM 24, and initializes the count value (i) to "0". The count value (i) corresponds to 1 pixel. It is provided that there are 0 to n pixels of thus read images. The CPU 21 manages n pixels in the RAM 24, and performs dust detection processing with respect to the images of 0 to n pixels, respectively.

In step S9, the CPU 21 calculates a difference (i.e., a distance) between the dust and a neighboring portion extracted in step S7 (i.e., reference position xi+1−reference position xi). The CPU 21 determines whether or not the value is equal to or greater than a first value (i.e., a first predetermined value), is equal to or less than a second value (i.e., a second predetermined value), or is between the first value and the second value. Herein, the first value is set to be greater than the second value.

In a case where a value of the difference between the dust and the neighboring portion extracted in step S7 is equal to or greater than the first predetermined value, the processing proceeds to step S13, whereas, in a case where the value is equal to or less than the second predetermined value, the processing proceeds to step S11. In a case where the CPU 21 determines that thus calculated value is less than the first value and greater than the second value, the CPU 21 determines that the apparatus is not in a normally readable condition and the processing proceeds to step S10.

A density level corresponding to the first predetermined value and a density level corresponding to the second predetermined value may be preliminary set in the factory before the image reading apparatus is shipped. Alternatively, the density levels may be set by the user in such a manner that the user can set the density levels by using an operation unit 50 or an operation unit of an external device connected through a network (not shown).

The second predetermined value may be set in such a manner that the value is unnatural if the CPU 21 determines there is a large white dust between the positions of xi and x(i+1). The first predetermined value may be set in such a manner that the value is natural if the CPU 21 determines there is a small black dust at each of the positions of xi and x(i+1). A dot may be used as a unit but other than the dot may also be used.

In step S10, the CPU 21 determines there is a dust having the same color as the document guide plate 12 at a portion on the document positioning glass 41 at the position sandwiched between xi+1 and xi used in the difference calculation in step S9 and thus a level of the read image cannot be corrected by an image correcting unit.

Accordingly, the CPU 21 causes the operation unit 50 as a user interface of the image reading apparatus or a user interface of a host device to be connected via an interface to display a screen that urges the user to clean up the document positioning glass 41. Then, the series of processing is ended.

In step S11, on the other hand, the CPU 21 determines there is a dust having the same color as the document guide plate 17 at a portion between xi+1−xi that is used in the difference calculation of step S9, and thus the correction can be done by the image processing unit 30. The CPU 21 determines that a dust, that is positioned around (x(i+1)−xi)/2 and has a width (x(i+1)−xi), is attached onto the document positioning glass 12.

In step S12, the CPU 21 adds "2" to a value of counter of the RAM 24. In step S13, on the other hand, the CPU 21 determines that a single black dust is attached onto the document glass 12 at a portion of xi. In step S14, the CPU 21 adds "1" to the value of the counter i of the RAM 24.

In step S15, the CPU 21 compares the number n of a value beyond the predetermined value 73 detected in step S7 with a value of the counter i of the RAM 24. In a case where the CPU 21 determines that the comparison finds out that i>n (YES in step S15), the processing proceeds to step S16, whereas, in a case where the CPU 21 determines that the comparison finds out a result other than the above (NO in step S15), the processing proceeds to step S9.

In step S16, the CPU 21 sets portions of the dust detected in steps S5, S11, and S13 to the image processing unit 30, and starts instructing the scanner apparatus 26 to perform document reading. The scanner apparatus 26 having received the instruction reads out the document 3 according to the above described steps and stores the data thereof in the RAM 24 while providing an interpolation processing to a pixel neighboring in the main scanning direction according to a method disclosed in Japanese Patent Application Laid-open No. 2002-176542. The CPU 21 performs the interpolation processing suitable for the attribute of the detected foreign matter (i.e., the black dust and the white dust).

As described above, in a case where the flow finds out that the dust 42 such as a speck or dirt or the dust 43 such as a stain of whiteout and paper dust is attached onto the document positioning glass 12 illustrated in FIG. 3A, an image illustrated in FIG. 5A is obtained if no image correction is provided. However, a resulting image of FIG. 5B can be obtained since the image correction is performed in the present invention.

FIGS. 5A and 5B illustrate image reading conditions of the image reading apparatus. FIG. 5A illustrates a reading result in a case where the image of the document 3 is read out under the condition adversely affected by the attached dust 42 and 43 and no correction is provided to the image of the document 3. FIG. 5B illustrates a reading result when the adverse affect by the attached dust 42 and 43 is corrected according to the image processing.

According to the present exemplary embodiment, the CCD sensor unit 16 reads out the document guide plate 17 twice with varied light amounts when the exposure unit 13 exposes the document guide plate 17 to light. Accordingly, without a dedicated circuit for detecting the white dust, the CPU 21 can detect and identify the black dust and the white dust attached onto the document positioning glass 12.

Therefore, the CPU 21 can detect the white dust and the black dust, having different attributes and attached to the platen 12, and a stain on the document positioning glass 12 with ease, correct the read image according to the attribute thereof, and prompt the user to clean up the document positioning glass 12.

For example, in a case where the dust 42 and the dust 43 illustrated in FIG. 3A are attached, there is a case that the CUP 21 erroneously detects a portion of the dust if the CPU 21 detects the dust only by performing the detection illustrated in FIG. 3B. For, example, in a case where the detection result as illustrated in FIG. 3B is obtained, the CPU 21 detects that a large black dust is attached to a position corresponding to a position 51 and a small dust such as hairs are attached to positions corresponding to positions 52 and 53.

In such a case, the read image corresponding to the position 51 can be corrected by providing an image interpolation to the read image by using pixels neighboring to the dust 42. However, right correction cannot be done to the positions 52 and 53. This is because, in a case of the position 52, a left pixel in FIG. 3B is an image of the document 3 that is correctly read out, whereas a right pixel in FIG. 3B is an image of the document 3 that is incorrectly read, i.e., the image is the white dust 43. Nonetheless, the read image corresponding to the position 52 is interpolated by using the pixels.

Also, a left pixel of the dust 53 in FIG. 3B is not an image of the document 3 that is correctly read, so that the dust 53 cannot be correctly interpolated.

To the contrary, in a case where the dust is detected according to the method of the present exemplary embodiment as illustrated in FIG. 4, white dust can be correctly detected between the position 52 and the position 53 based on a change of the density level and a positional relationship according to reading processing performed twice. Therefore, the CPU 21 can perform a linear interpolation by using a pixel left to the position 52 (i.e., a read image of the document 3) and a pixel right to the position 53 (i.e., a read image of the document 3).

As described above, the CPU 21 determines an interpolation processing method according to the attribute (i.e., the type) of the dust. More specifically, the CPU 21 determines a pixel to be used when the linear interpolation is performed.

The white dust is detected by using such a method. That is, the white dust can be detected without employing a dedicated circuit for detecting the white dust. As a result thereof, an increased cost of the image reading apparatus can be restrained.

The first predetermined value and the second predetermined value are used in the above described exemplary embodiment. However, in a case where one of the predetermined values is used and the width (x(i+1)−xi) is equal to or greater than the predetermined value, the processing may proceed to step S13, whereas, in a case other than the above, the processing may proceed to step S11.

The first reading processing and the second reading processing may be performed inversely. In such a case, a difference is calculated in such a manner that a density level indicated by the optical information read according to the first reading processing is subtracted from a density level indicated by the optical information obtained according to the second reading processing.

The image reading apparatus is connected to the image forming apparatus including a printer unit and a network transmission unit. The image reading apparatus may read and correct the image of the document 3 to print or transmit the image according to an instruction of the user.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-287348 filed Dec. 18, 2009, which is hereby incorporated by reference herein in its entirety.

What is claimed is:

1. An apparatus, comprising:
a reading unit configured to read an image of a document by eight being emitted to the document by a light emitting unit;
a control unit configured to cause the reading unit to perform first reading processing for obtaining first information by causing the light emitting unit to emit light with a first light amount and to perform second reading processing for obtaining second information by causing the light emitting unit to emit light with a second light amount that is smaller than the first light amount while no document is placed at a reading position of the reading unit;
a detecting unit configured to detect a first and a second position as positions of a foreign matter existing at the reading position according to a difference between the first and second information; and
a determining unit configured to determine, in a case where an interval between the first position and the second position detected by the detecting unit is greater than a predetermined value, that a black foreign matter exists at each of the first position and the second position, and in a case where the interval between the first position and the second position detected by the detecting unit is less than the predetermined value, that a white foreign matter exists between the first position and the second position.

2. The apparatus according to claim 1, further comprising:
a display unit configured to display a screen that urges a user to maintain the reading position in a case where the detecting unit detects the foreign matter.

3. The apparatus according to claim 2, further comprising:
a correcting unit configured to correct an image corresponding to a position of the detected foreign matter.

4. The apparatus according to claim 3, wherein the correcting unit determines a correcting method according to a type of the detected foreign matter.

5. A method comprising:
reading an image of a document by light being emitted to the document by a light emitting unit;
causing the reading unit to perform first reading processing for obtaining first information obtained by causing the light emitting unit to emit light with a first light amount, and second reading processing for obtaining second information obtained by causing the light emitting unit to emit light with a second light amount that is smaller than the first light amount while no document is placed at a reading position of the reading unit;
detecting a first position and a second position as positions of a foreign matter existing at the reading position according to a difference between the first and second information; and
determining, in a case where an interval between the first position and the second position is greater than a predetermined value, that a black foreign matter exists at each of the first position and the second position, and in a case where the interval between the first position and the second position is less than the predetermined value, that a white foreign matter exists between the first position and the second position.

6. The method according to claim 5, further comprising:
displaying a screen that urges a user to maintain the reading position in a case where the foreign matter is detected.

7. The method according to claim 6, further comprising:
correcting an image corresponding to a position of the detected foreign matter.

8. The method according to claim 7, wherein the correcting determines a correcting method according to a type of the detected foreign matter.

9. A non-transitory computer readable storage medium for storing a computer program for controlling an apparatus, the computer program comprising:
a code to read an image of a document, by light being emitted to the document by a light emitting unit, by a reading unit;
a code to cause the reading unit to perform first reading processing for obtaining first information after the light emitting unit emitting light with a first light amount and to perform second reading processing for obtaining second information after the light emitting unit emitting light with a second light amount that is less than the first light amount while no document is placed at a reading position according to the reading unit;
a code to detect a first position and a second position as positions of a foreign matter existing at the reading position according to a difference between the first and second information; and
a code to determine, in a case where an interval between the first position and the second position is greater than a predetermined value, that a black foreign matter exists at each of the first position and the second position, and in a case where the interval between the first position and the second position is less than the predetermined value, that a white foreign matter exists between the first position and the second position.

10. The non-transitory computer readable storage medium according to claim 9, further comprising:
a code to display a screen that urges a user to maintain the reading position in a case where the foreign matter is detected.

11. The non-transitory computer readable storage medium according to claim 10, further comprising:
a code to correct an image corresponding to a position of the detected foreign matter.

12. The non-transitory computer readable storage medium according to claim 11, wherein the code to correct the image determines a correcting method according to a type of the detected foreign matter.

13. The apparatus according to claim 1, wherein the detecting unit further detects a black foreign matter existing at the reading position according to the second information obtained by the control unit causing the light emitting unit to emit light with the second light amount that is smaller than the first light amount.

14. The apparatus according to claim 2, wherein the display unit displays the screen in a case where it is determined that the foreign matter detected by the detecting unit is neither a white foreign matter nor a black foreign matter dust.

* * * * *